(12) United States Patent
Liu

(10) Patent No.: US 7,174,176 B1
(45) Date of Patent: Feb. 6, 2007

(54) CORDLESS SECURITY SYSTEM AND METHOD

(76) Inventor: Frank Kung Fu Liu, 23130 Ridge Line, Diamond Bar, CA (US) 91765

( * ) Notice: Subject to any disclaimer, the term of this patent is extended or adjusted under 35 U.S.C. 154(b) by 235 days.

(21) Appl. No.: 10/889,628

(22) Filed: Jul. 12, 2004

(51) Int. Cl.
*H04Q 7/20* (2006.01)

(52) U.S. Cl. ............... 455/462; 455/404.1; 455/414.1

(58) Field of Classification Search ............ 455/404.1, 455/414.1, 462, 465, 74.1, 550.1, 557, 558, 455/426.1; 340/531, 425.5, 426.1, 426.16
See application file for complete search history.

(56) References Cited

U.S. PATENT DOCUMENTS

| | | | | |
|---|---|---|---|---|
| 4,436,957 | A * | 3/1984 | Mazza et al. | 455/411 |
| 5,200,735 | A | 4/1993 | Hines | |
| 5,587,701 | A | 12/1996 | Hess | |
| 6,006,088 | A * | 12/1999 | Couse | 455/415 |
| 6,049,273 | A | 4/2000 | Hess | |
| 6,060,994 | A * | 5/2000 | Chen | 340/521 |
| 6,100,792 | A * | 8/2000 | Ogino et al. | 340/426.25 |
| 6,243,010 | B1 * | 6/2001 | Addy et al. | 340/539.16 |
| 6,255,944 | B1 * | 7/2001 | Addy | 340/539.3 |
| 6,445,921 | B1 * | 9/2002 | Bell | 455/426.1 |
| 6,542,735 | B1 * | 4/2003 | Carley | 455/420 |
| 6,799,031 | B1 * | 9/2004 | Lewiner et al. | 455/404.1 |
| 6,879,844 | B2 * | 4/2005 | Chen | 455/558 |
| 7,030,752 | B2 * | 4/2006 | Tyroler | 340/531 |
| 2001/0055954 | A1 * | 12/2001 | Cheng | 455/74.1 |
| 2005/0197061 | A1 * | 9/2005 | Hundal | 455/41.2 |
| 2006/0166659 | A1 * | 7/2006 | Wiese et al. | 455/418 |

* cited by examiner

*Primary Examiner*—Joseph Feild
*Assistant Examiner*—Olumide Ajibade-Akonai
(74) *Attorney, Agent, or Firm*—Dan Brown Law Office; Daniel R. Brown

(57) ABSTRACT

A cordless security system that communicates through a wireless telephone network. A wireless node, having a wireless transceiver adapted to communicate wireless signals with the wireless telephone network, and a cordless transceiver adapted to communicate cordless signals with plural cordless terminal devices enables a cordless local area network. The wireless node also includes a controller that operates to couple telephone calls between the wireless transceiver and the cordless transceiver. The controller routes cordless data packets in the cordless signals through the cordless transceiver and amongst the plural cordless terminal devices. The cordless security system includes plural cordless security sensor terminal devices that communicate cordless sensor signal encoded within a cordless data packet into the cordless local area network. A cordless security control panel terminal device communicates cordless alarm signals encoded within a cordless data packet into the cordless local area network. The control panel also transmits a cordless outgoing audio message within the cordless local area network. A cordless security alarm terminal device, such as a siren produces an audible output.

24 Claims, 10 Drawing Sheets

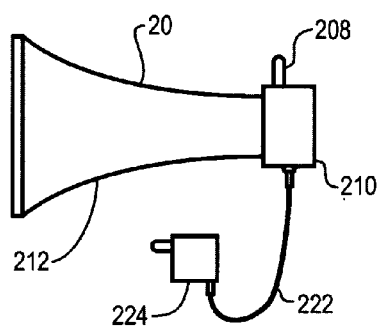
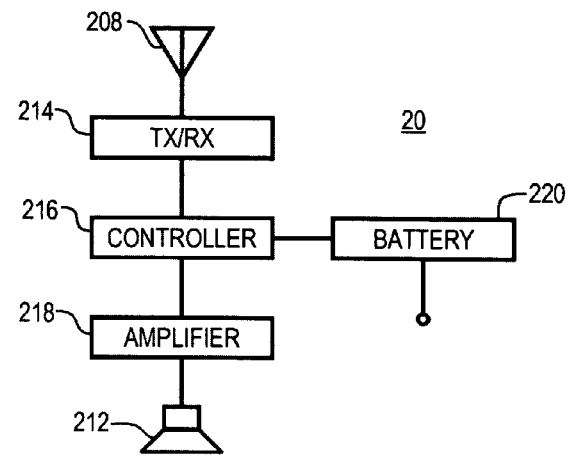
Fig. 20     Fig. 21
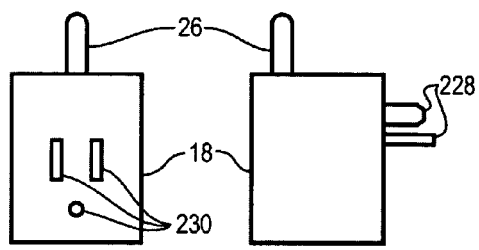
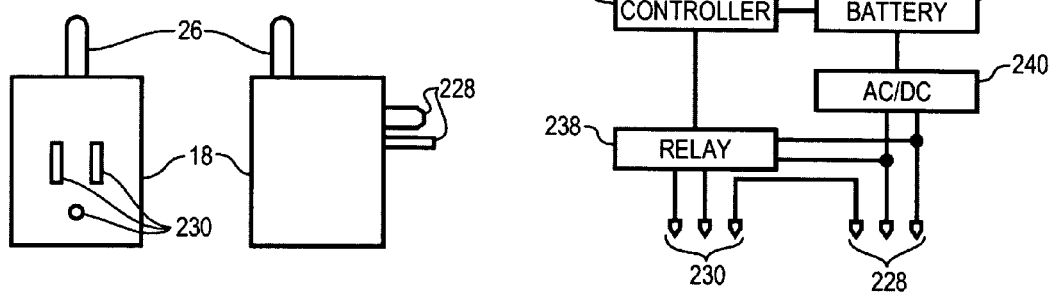
Fig. 22a    Fig. 22b     Fig. 23

242

CORDLESS SECURITY SYSTEM AND METHOD

BACKGROUND OF THE INVENTION

1. Field of the Invention

The present invention relates to security systems. More specifically, the present invention relates to cordless security systems employing a wireless telephony resource in conjunction with a local cordless protocol for communication with plural security sensors, alarms, and control stations.

2. Description of the Related Art

Residential and commercial security systems are known in the art. Such systems generally include several sensors that detect various stimuli and produce sensor signals as a result of such detection. Conductive loop sensors are used to detect door and window opening stimuli. Smoke and carbon monoxide detectors sense their corresponding atmospheric conditions. There are also motion detectors, glass breakage detectors, and other detectors known to those skilled in the art. Security systems generally include a control panel that enables user access for programming, operation, password entry, alarm cancellation and so forth. When a sensor signal is received, it is coupled to the control panel, which will perform some action in response to receipt of the signal. Frequently, an alarm signal is sent to an alarm, such as a siren, horn, or bell, which activates that alarm. Another possible response is for the control panel to access a remote location and report the alarm condition. The remote may be an alarm monitoring company or an individual interested in receiving notice of an alarm condition.

Alarm systems have traditionally used electric wires or cables to interconnect the various sensors with the control panel. Sometimes remote keypads are included to allow user access, for example, at entry points to the protected home or facility. Telephone service has been used to access the remote locations. Such service has traditionally been connected with a metallic telephone circuit from the user's facility to the public switched telephone network ("PSTN"). Of course, there are disadvantages to using wires to interconnect security systems. Installation cost is high, the wires are prone to damage over time, and the wires may be intentionally cut in an effort to disable the security system. Others have addressed the disadvantages of wire-connected security systems be employing various wireless devices.

U.S. Pat. No. 5,200,735 to Hines for WEATHER PROTECTED PORTABLE SECURITY SYSTEM FOR IN-FIELD USE discloses a wireless security system with several types of remote sensors, each having a transmitter for sending a signal to a master control to report a sensed condition. The master control includes a receiver for receiving the sensor transmissions, and a transmitter for sending a signal to a remote alarm unit in response to a sensed condition. The master control unit can activate a remote audible alarm and dial a telephone number through a cellular telephone, which is directly coupled to the master controller.

U.S. Pat. No. 5,587,701 to Hess for PORTABLE ALARM SYSTEM ("Hess(1)")discloses a portable alarm system with most of the alarm functions contained in a portable enclosure. Some of the sensors are included in the enclosure and some communicate via radio signals. The alarm is capable of initiating a telephone call to a security monitor station either by conventional hard-wired telephone lines within a building or through a cellular transceiver that is directly coupled to the portable enclosure.

U.S. Pat. No. 6,049,273 to Hess for CORDLESS REMOTE ALARM TRANSMISSION APPARATUS ("Hess(2)")is a continuation-in-part of Hess(1). Hess(2) adds the concept of a "cellemetry" modem, which is a method of communicating over the cellular network using cellular data instead of voice. Hess(2) also teaches the use of a cordless transmitter to allow the device to access dial tone through a nearby cordless telephone transceiver to access a landline telephone resource.

U.S. Pat. No. 6,255,944 to Addy for REMOTE INDICATION DEVICE FOR USE IN WIRELESS SECURITY SYSTEMS discloses a wireless security system with a central control unit and a remote indication device. The central controller is coupled to a wireless telephone dialer. The remote indication device provides feedback in the form of a display indicating commands and status of the system. Alarm conditions are first transmitted to the central receiver, then forwarded by radio to the remote indication device, finally, the remote indication device sends them back to the central receiver, where a suitable alarm is activated.

The prior art does address the use of wireless technology to overcome the problem with wired security systems. The use of a cellular telephone eliminates the risk of the telephone lines from being cut, but does so at the added cost of employing a dedicated cellular telephone resource. A cordless telephone interconnection is taught, however, the cordless base unit must be tied to a metallic loop, which is vulnerable to damage or sabotage.

It is therefore understood that wireless security systems are known, however each has some disadvantages as to cost or resource utilization. Especially considering the general need users have for telephony services at most facilities that are protected by a security system. Thus, there is a need in the art for a wireless security system and method that overcomes the problems in the prior art, and which integrates resources to maximize utilization while still overcoming the problems associated with wired security systems.

SUMMARY OF THE INVENTION

A cordless security system that communicates through a wireless telephone network is taught. The system includes a wireless node, having a wireless transceiver adapted to communicate wireless signals with the wireless telephone network, and a cordless transceiver adapted to communicate cordless signals with plural cordless terminal devices, thereby enabling a cordless local area network. The wireless node also includes a controller that operates to couple telephone calls between the wireless transceiver and the cordless transceiver, thereby enabling access to the wireless telephone network through the cordless local area network. The controller also operates to route cordless data packets in the cordless signals through the cordless transceiver and amongst the plural cordless terminal devices. The cordless security systems also includes a cordless security sensor terminal device that communicates a cordless sensor signal encoded within a cordless data packet into the cordless local area network upon receipt of an external stimulus. There is also a cordless security control panel terminal device that communicates a cordless alarm signal encoded within a cordless data packet into the cordless local area network upon receipt of the cordless sensor signal. The control panel also transmits a cordless outgoing audio message within the cordless local area network. In operation, the wireless node receives and routes the cordless outgoing audio message through the wireless telephone network to a predetermined telephone number.

In a specific embodiment of the foregoing invention, a cordless telephone terminal device is added, which communicates cordless signals, including cordless audio signals, within the cordless local area network, thereby enabling telephone communications through the wireless node and into the wireless telephone network. In a refinement to the invention, the wireless node routes the cordless outgoing message to the cordless telephone terminal device, so as to alert the user of an alarm condition. In another embodiment, the system further includes a cordless security alarm terminal device that has an alarm output, and that activates the alarm output upon receipt of the cordless alarm signal. The cordless security alarm terminal device may be a cordless siren or a cordless alarm output receiver.

In another specific embodiment, the cordless data packet portions are uniquely addressed. They may be uniquely addressed with a source and destination cordless terminal device identifier. The cordless security control panel is refined further in another embodiment. In particular, a microphone and a loudspeaker are added. They are coupled to an audio recording means that stores outgoing message audio signals input to the microphone, and outputs the outgoing message audio signals to the loudspeaker. The control panel may also include an alphanumeric display and a keypad. The display and keypad are coupled to a processor that processes security system commands entered via the keypad, which outputs security system information to the alphanumeric display.

In another embodiment, the plural cordless terminal devices include one or more of a cordless conductive loop sensor, a cordless smoke detector, a cordless carbon monoxide sensor, a cordless motion detector, and a cordless glass breakage sensor. The system also supports a cordless remote keypad terminal device. This device includes a keypad, and a processor coupled to the keypad. Together, they process security system commands entered via the keypad, and output the security systems commands encoded within cordless data packets to the cordless local area network for receipt by the control panel.

In a particular embodiment, the wireless node further includes a metallic telephone line interface coupled to the controller. The controller couples telephone calls between the metallic telephone line interface and the cordless transceiver, thereby enabling access to the public switched telephone network through the cordless local area network. In another particular embodiment, the wireless node further includes a subscriber identity module interface that is adapted to accept subscriber identity modules. The modules have user wireless account identities and data stored therein, and are coupled to the controller. In operation, the controller transfers user account identity data from the subscriber identity module interface to the wireless telephone network.

The present invention also teaches a method of implementing a cordless security system coupled to a wireless telephone network through a wireless node, where the wireless node has a cordless transceiver adapted to communicate cordless signals, according to a cordless local area network protocol, with plural cordless terminal devices. The devices include a cordless security sensor terminal device and a cordless security control panel terminal device. The method includes the steps of communicating a cordless sensor signal encoded within a cordless data packet from the cordless security sensor terminal device into the cordless local area network upon receipt of an external stimulus, and, routing the cordless sensor signal by the wireless node to the cordless security control panel terminal device. Then, communicating a cordless alarm signal encoded within a cordless data packet, by the cordless security control panel terminal device, into the cordless local area network upon receipt of the cordless sensor signal. Next, transmitting a cordless outgoing audio message, by the cordless security control panel terminal device, into the cordless local area network. The method also includes the step of routing the cordless outgoing audio message through the wireless telephone network to a predetermined telephone number in a wireless telephone call.

In a specific embodiment of the foregoing method, steps directed to coupling a telephone call from a cordless telephone terminal device into the wireless telephone network are added. These steps include communicating cordless signals, including cordless audio signals, within the cordless local area network, and, enabling telephone communications through the wireless node and into the wireless telephone network. In another specific embodiment, the step of routing the cordless outgoing audio message to a cordless telephone terminal device is added.

In a refinement of the foregoing method, the step of activating an alarm output of a cordless security alarm terminal device upon receipt of the cordless alarm signal is added. The cordless security alarm terminal device may be a cordless siren or a cordless alarm output receiver. Unique identity of the terminal devices is supported by adding the step of uniquely addressing the cordless data packet portions, or by adding the step of uniquely addressing the cordless data packet portions with a source and destination cordless terminal device identifier. The steps of pre-recording and storing the cordless outgoing audio message are added in another embodiment.

In a specific embodiment of the foregoing method, the plural cordless terminal devices include one or more of a cordless conductive loop sensor, a cordless smoke detector, a cordless carbon monoxide sensor, a cordless motion detector, and a cordless glass breakage sensor. In another aspect of the inventive method the wireless node further includes a metallic telephone line interface. Then, the method further comprises the step of coupling a telephone call between the metallic telephone line interface and the cordless transceiver, thereby enabling access to the public switched telephone network through the cordless local area network. Subscriber identity is addressed in another embodiment wherein the wireless node further includes a subscriber identity module interface adapted to accept subscriber identity modules having user wireless account identities and data stored therein. Then, the method further comprises the step of transferring user account identity data from the subscriber identity module interface to the wireless telephone network.

BRIEF DESCRIPTION OF THE DRAWINGS

FIG. 20 is a drawing of a cordless siren according to an illustrative embodiment of the present invention.

FIG. 21 is a functional block diagram of a cordless siren according to an illustrative embodiment of the present invention.

FIG. 22a and FIG. 22b are an end view and side view, respectively, of a cordless alarm output receiver according to an illustrative embodiment of the present invention.

FIG. 23 is a functional block diagram of a cordless alarm output receiver according to an illustrative embodiment of the present invention.

DESCRIPTION OF THE INVENTION

Figure 1:
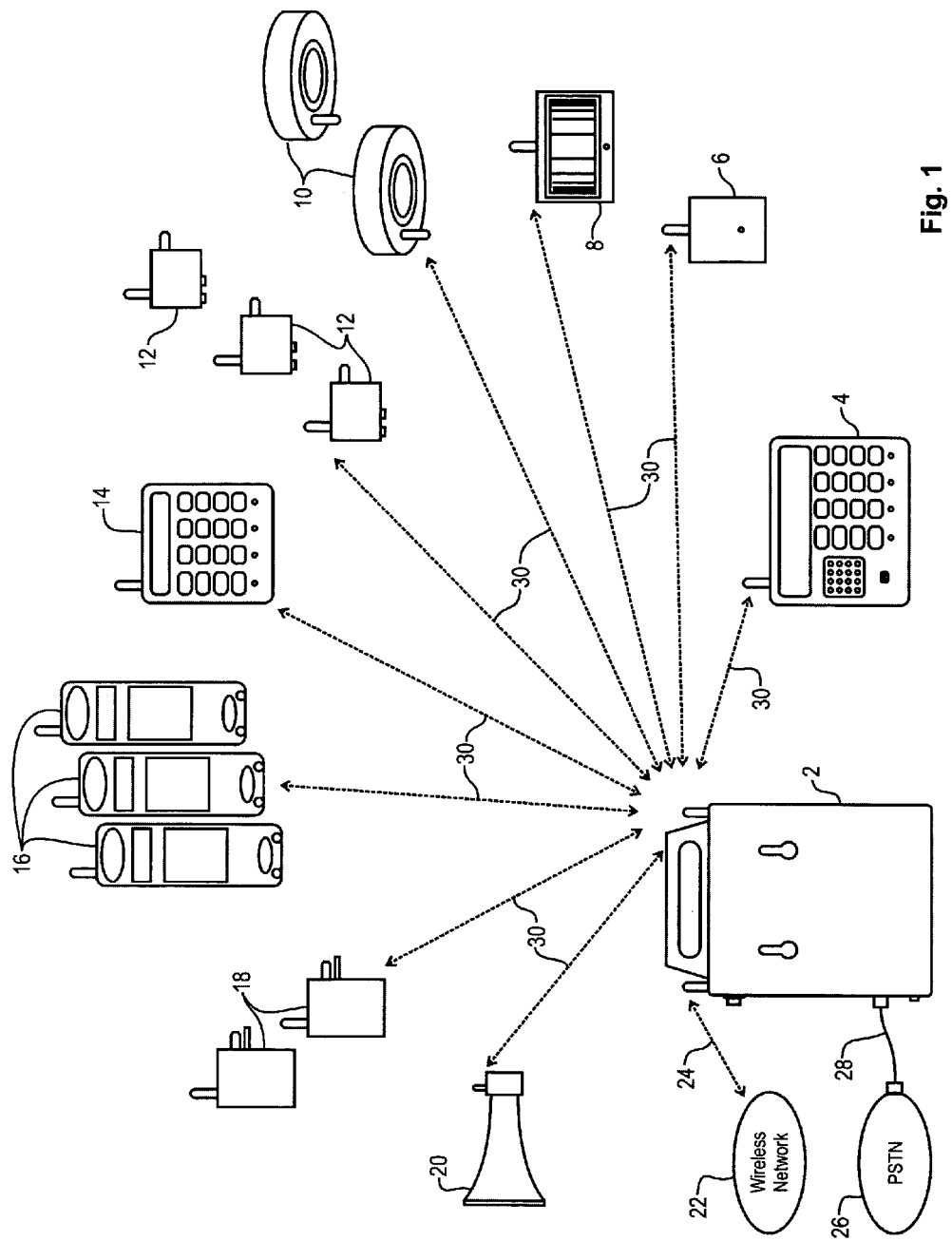
FIG. 1 is a system diagram according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

The illustrative embodiment cordless security system and method of the present invention integrates wireless, or cellular, network telephone services with a wireless security system. A cordless telephone local area network is used to embody the wireless security system. The cordless local area network supports both duplex audio and packet data communications. In operation, the illustrative embodiment security system makes contact with law enforcement or a security monitoring service though a wireless and cordless communications node (hereinafter "wireless node"). The wireless node couples a wireless telephone resource to a single or multiple handset cordless base station. The cordless protocol enables voice and cordless data protocols by establishing a cordless local area network. In addition, the cordless base also enables a security system data protocol over the cordless telephone radio signals. This is accomplished through the use of data packet identification and certain function commands and data fields transmitted using the cordless local area network. Security specific packets may be generally referred to as "security data". Thus, the wireless node handles telephone calls through plural cordless handsets and a wireless network, as well as the data and audio communications useful in the security system.

The wireless node hosts the security system in the illustrative embodiment. The basic components of the security system include plural security sensors, each of which transmits sensor signals to the wireless node. These include sensors to detect switch closures and openings, smoke detectors, motion detectors, glass breakage detectors and all those other kinds of detectors used in modem security systems. The wireless node forwards these signals to a cordless control panel component of the security system. The cordless control panel is both a controller for the security system and the primary user interface point in the security systems. The control panel includes a keypad and display. An outgoing message generator is provided, along with a microphone and loudspeaker, which enable the recording and playing back of outgoing messages. The controller in the control panel interprets and responds to sensor signal generated in the system. In addition, the system includes various kinds of wireless alarm indicators. These include sirens, lights, and switch closures, for activating external devices. Cordless remote keypads are provided so that users can access the system from convenient locations, such as entryways or from their automobile.

Functionally speaking, the security system in the illustrative embodiment receives security data from the sensors from time to time. Some data is indicative of system status, such as battery condition and sensor performance. Some data represents alarm conditions, such as open windows or doors. The data is relayed through the wireless node to the control panel. The control panel is programmed to respond to the sensor inputs. Of course, one possible response is to activate an alarm, such as a siren. This is accomplished by transmitting a security data message to the appropriate alarm, which causes the alarm to sound. Another response is to transmit an outgoing message, together with the destination telephone number to the wireless node. The wireless node accesses the destination telephone number through the wireless network, and plays the outgoing message over the audio path of the cordless systems. The outgoing message can also be transmitted to a cordless telephone handset operating in the cordless local area network. In this way, the user can be immediately notified of any alarm condition. All of the security system functions known to those skilled in the art can be implemented with the present invention. The node is enabled to serve multiple purposes, all of which are portable and secure from tampering of physical wiring.

Reference is directed to FIG. 1, which is a system diagram of a cordless security system according to an illustrative embodiment of the present invention. A wireless node 2 communicates with a wireless network using radio waves 24 implemented according to a wireless telephone system communication protocol. The wireless network 22 can be any of those presently deployed, which includes but is not limited to, AMPS networks, TDMA networks, CDMA networks, GSM Networks, the T-Mobile network, or other networks known to those skilled in the art. The network 22 may also be one of those that may later be deployed or later becomes know to those skilled in the art. The essential aspect of the wireless network 22, with respect to the present invention, is that wireless audio signals and wireless control signals are transmitted within wireless signals. Further, that the wireless transceiver (discussed hereinafter) within the wireless node 2 is adapted to convert the audio and control portions of the wireless signals for use in subsequent processing. The wireless node 2 optionally includes a metallic telephone line interface that is coupled to the public switched telephone network ("PSTN") 26 with a convention RJ-11 telephone cable 28. Thus, the wireless node 2 has access to the telephone network either through a wireless connection to a wireless network 22 or a wired connection to the PSTN 26.

In addition to wireless communications 24, the wireless node 2 also includes a cordless communications transceiver and antenna for communicating cordless signals 30 with various cordless terminal devices (discussed more fully hereinafter). The cordless signals 30 operate in accordance with a cordless local area network protocol. The radio frequency bands and particular protocol used in the cordless radio signals 30 may be any of those known to those skilled in the art, or that later become known to those skilled in the art. These include, but are not limited to the 900 MHz cordless band, the 1.8 GHz cordless band, the 2.4 GHz cordless band, and the 5.8 GHz band. The particular signaling protocol may operate in accordance with, but is not limited to, an analog standard, a digital standard, the PHS standard, the DECT standard, and the various DSS protocol standards.

The wireless node 2 communicates cordless signals 30 with plural cordless terminal devices. Included among these plural cordless terminal devices are multiple cordless telephone handsets 16. The multiple cordless terminal handsets 16 are able to access the wireless network 22, the PSTN 26, and are able to access one another in an intercom mode of operation. Thus, any one of the plural cordless telephone handsets can receive a telephone call from, or place a telephone call to, the wireless network 22 or the PSTN 26. In an illustrative embodiment, multiple wireless telephone numbers can be assigned to the wireless node 2 by the wireless network 22, and the wireless node 2 is able to route each unique wireless telephone number to a particular one of the plural cordless telephone handsets 16. This is possible because each of the cordless telephone handsets 16 is assigned a unique identity within the cordless telephone protocol. Since each cordless telephone handset 16 has a unique identity, any of the cordless telephone handsets is able to place a call to any other cordless telephone handsets 16 by addressing the unique identity of the desired unit. Addressing of either a telephone number or the unique identity of another cordless telephone handset is accomplished with a telephone keypad on the cordless telephone handset 16.

Continuing in FIG. 1, in addition to the telephony functions of the illustrative embodiment, the cordless radio protocol 30 also supports the communications of security system data within the cordless local area network. In effect, the wireless node 2 acts as a host for the cordless security system. A cordless control panel 4 communicates over the cordless local area network 30 with various other security system terminal devices. The cordless control panel 4 is the central control and access point for the cordless security system. A processor and memory in the cordless control panel embody the security system control and functions. System programming, monitory, and outputs are controlled from this point. In addition to the cordless control panel 4, users of the system gain limited system control through the use of one or more cordless remote keypads 14. Cordless keypads 14 are useful at entry points to the secured area, and other convenient locations, including the inside of a user's automobile or as a key fob device. The cordless nature of the system enables such flexibility. The cordless keypads 14 allow the user to arm and disarm the system, enter passwords, and perform some of the system functions, as are well known to those skilled in the art.

The cordless security system in FIG. 1 also illustrates some of the cordless sensor devices contemplated in the invention. Each of the sensors includes a cordless transceiver with antenna and a controller that operates to communicate according to the cordless local area network protocol 30. The sensor types include a glass breakage sensor 6, a motion detector sensor 8, smoke and carbon monoxide detectors 10, conductive loop sensors 12, as well as other sensor types know to be use to those skilled in the art. Each of these sensors shares the common attribute of communicating with the cordless control panel 4 over the cordless local area network 30. The security system illustrated in FIG. 1 also includes various security system output devices and alarms. These include, but are not limited to, cordless sirens 20 and cordless alarm output receivers 18. The cordless alarm output receivers 18 have a switched output that is activated by the cordless control panel 4 over the cordless network 30. The switched outlets can drive lights or other alarm devices.

Figure 4:
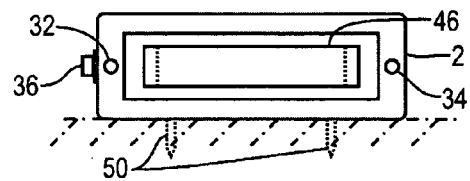
FIG. 2, FIG. 3, and FIG. 4 are a front view, side view and top view, respectively, of a wireless node according to an illustrative embodiment of the present invention.
Figure 2:
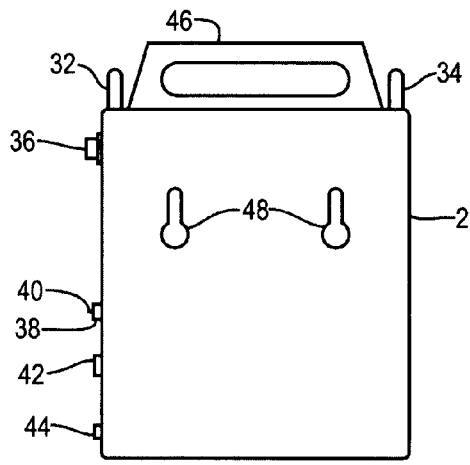
Figure 3:
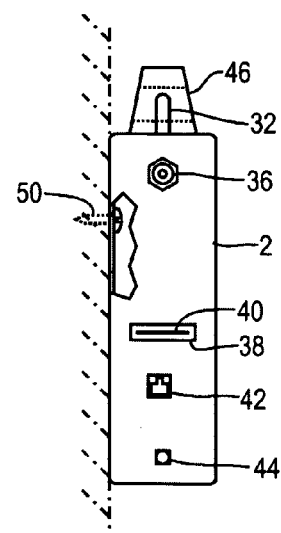

Reference is directed to FIG. 2, FIG. 3, and FIG. 4, which are a front view, side view and top view, respectively, of a wireless node 2 according to an illustrative embodiment of the present invention. The physical configuration of the wireless node is a matter of design and installation choices, as will be appreciated by those skilled in the art. The embodiment of FIGS. 2,3, and 4 illustrate an application where the wireless node 2 is mounted in a fixed position, such as in a home or office. The position of the wireless node can be selected to be out of sight, or for optimum wireless communication performance. An interior closet is a good choice for this embodiment. The wireless node 2 includes the wireless antenna 32 and the cordless antenna 34. A handle 46 is provided for ease of installation and convenience if the node 2 is ever moved. A pair of key-slots 48 are formed in the exterior of the node enclosure 2 and are used to attached the node 2 with screws 50 to a vertical surface, such as a closet wall, etc. Those skilled in the art will appreciate that any number of wall mounting structures could be applied to the wireless node 2. A power terminal 44 is provided for coupling external power, such as from a wall plug mounted AC transformer. In the fixed installation embodiment, and external wireless antenna connector 36 is provided. This allows the user to attach an antenna that may be remote mounted for better radio reception and transmission performance. An external RJ-11 jack 42 is provided in embodiments where metallic connection to the PSTN is included. A SIM card slot 38 and SIM card module 40 are also present on the exterior of the wireless node 2. The SIM card system will be more fully discussed hereinafter.

Figure 5:
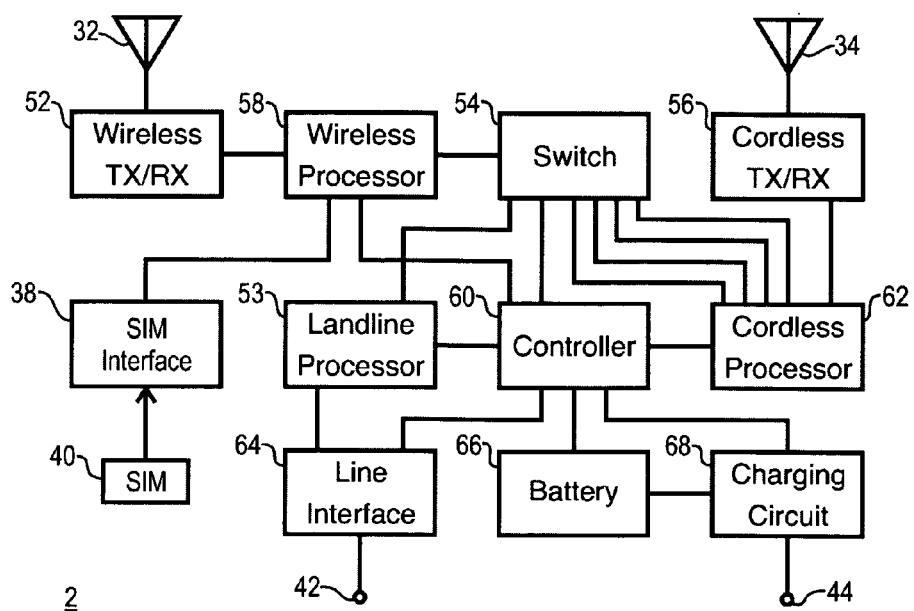
FIG. 5 is a functional block diagram of a wireless node according to an illustrative embodiment of the present invention.

Reference is directed to FIG. 5, which is a functional block diagram of the wireless node 2 according to an illustrative embodiment of the present invention. The wireless node 2 includes a wireless transceiver 52 that is coupled to a wireless antenna 32. A wireless processor 58 is coupled to the wireless transceiver 52. The wireless processor 58 couples wireless signals with the transceiver 52. The wireless processor 58 processes the wireless signals to and from wireless audio signals and wireless control signals. The wireless audio signals are coupled to a matrix switch 54 for interconnection with and between other telephone resources in the system, discussed hereinafter. The wireless control signals are coupled to and from a central controller 60, which has supervisory and control functions over the entire system. Thus, the controller 60 sends and receives wireless control signals with the wireless processor 58.

The wireless node 2 in FIG. 5 also includes a telephone landline subscriber line interface ("SLIF") circuit 64 for coupling via metallic interface to the PSTN. The SLIF circuit 64 couples landline telephone signals with a landline processor 63. The landline processor 63 converts landline audio signals and landline control signals to and from the landline telephone signals. Those skilled in the art are familiar with landline pulse and DTMF dialing strings, call progress signals, line voltages, and so forth. The landline audio signals are coupled to and from the landline processor 63 and the switch 54. The landline control signals are coupled to and from the landline processor 63 and the controller 60. Thus, the central controller 60 receives and generates suitable landline control signals during operation of the wireless node 2.

A cordless transceiver 56 couples cordless telephone signals via radio waves with plural cordless terminal units (not shown) through antenna 34. The cordless telephone signals are coupled to cordless processor 62, which couples plural cordless audio signals with switch 54, and couples cordless telephone control signals with controller 60. In the illustrative embodiment of FIG. 5, a digital cordless protocol is employed, such that a single transceiver can support plural simultaneous cordless conversations using time division or code division multiple access techniques, known to those skilled in the art.

The controller 60 and processor structure illustrated in FIG. 5 enable a central controller 60 to communicate all of cordless control signals, wireless control signals, and landline control signals. This enables the cross-communications amongst these various technologies. PABX functions can be readily implemented by controller 60, as will be appreciated by those skilled in the art. Calls can be originated from the wireless network, the PSTN via landline connection, or from any of the plural cordless terminal units. The controller analyzes the control data received and routes the call to the selected or specified destination. Any combination is possible. The audio connections are implemented by switch 54, which may be embodied as a cross-point switch in the digital or analog domains. Switch 54 can connect plural pairs of audio resources simultaneously, under control of controller 60. While the illustration in FIG. 5 shows separate processors for wireless 58, cordless 62 and landline 63 signals, those skilled in the art will appreciated that this illustration is applicable as both structural and functional. In one embodiment, all of the processors, as well as the controller 60 functions are implemented as discrete routines in a single physical device, such as a digital signal processor.

Now, continuing with the description respecting FIG. 5, a battery 66 and charging circuit 68 are employed such that the wireless node 2 can operate in battery or line power. The battery 66 of the wireless node 2 can be charged from line power with an external power source coupled to charging contacts 44. Those skilled in the art are familiar with such battery and power supply circuits.

The illustrative embodiment of FIG. 5 includes utilization of industry standard subscriber identity modules ("SIM"), which accepts a SIM card. A SIM is a postage-stamp sized integrated circuit device that includes random access memory. The SIM card is basically a tiny computing device that accesses stored data and computer functions. Within the SIM card is stored a user's unique identity and various parameters of personal information. Also includes, is personal data, such as a telephone book list of names and numbers, etc. The SIM cards are portable and enable each user to transfer their identity from one telephone device to another. The SIM card is inserted into a compatible receptacle in each compliant device, enabling the user to transfer their identity and personal information. SIM card technology is known to those skilled in the art. In FIG. 5, a SIM card receptacle 38 is provided to receive a SIM card 40.

In the illustrative embodiment, the SIM receptacle 38 has a single SIM card slot, although plural slots are contemplated under the teachings of this invention. The SIM card receptacle 38 allows plural users to insert their personal SIM card, and thereby their personal identity, into the node 2. Thus, each user can access their personal identity, and thereby keep and protect their personal billing and air-time usage. The use of wireless services can be maintained as unique and personal to each identity. On the other hand, the identities may also be shared amongst plural users, if such an approach is desired.

Figure 6:
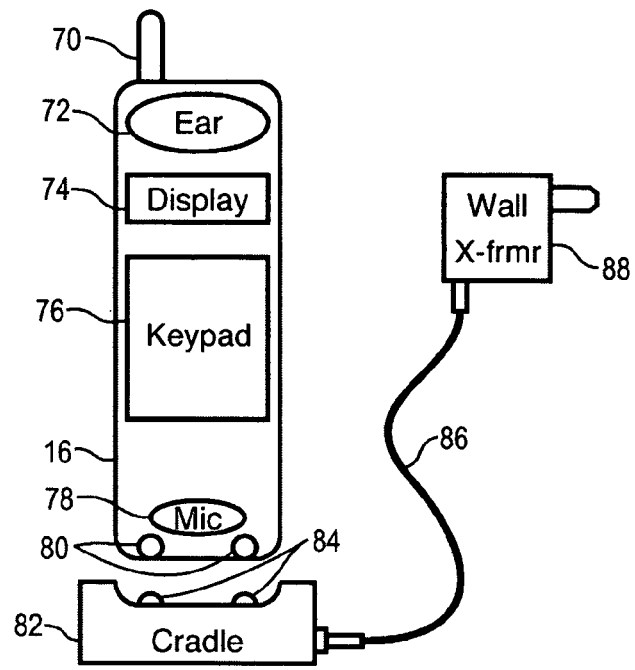
FIG. 6 is a drawing of a cordless telephone handset, with charging cradle, according to an illustrative embodiment of the present invention.

Reference is directed to FIG. 6, which is a drawing of a cordless telephone handset 16, with charging cradle 82, according to an illustrative embodiment of the present invention. While FIG. 6 illustrates a conventional cordless telephone handset design, the present invention contemplates the use of any of the variety of cordless handsets that are known to those skilled in the art or that may later become available. The handset 16 includes an antenna 70 for communicating cordless signals, including audio and cordless control signals with the wireless node (not shown). An earphone 72 and microphone 78 are provided to accomplish the user ear and mouth acoustic interface. A telephone keypad 76 and display 74 are provided, as are customary in cordless telephones. A pair of battery charging contacts 80 are presented on the exterior of the housing 16. The battery charging contacts 80 engage a pair of battery charging terminals 84 that are present in the charging cradle 82. The charging cradle 82 supports cordless handset 16 and charges its battery when the two devices are engaged. A cable 86 couples the cradle 82 to a wall-plug transformer, which provides a power source to the system.

Figure 7:
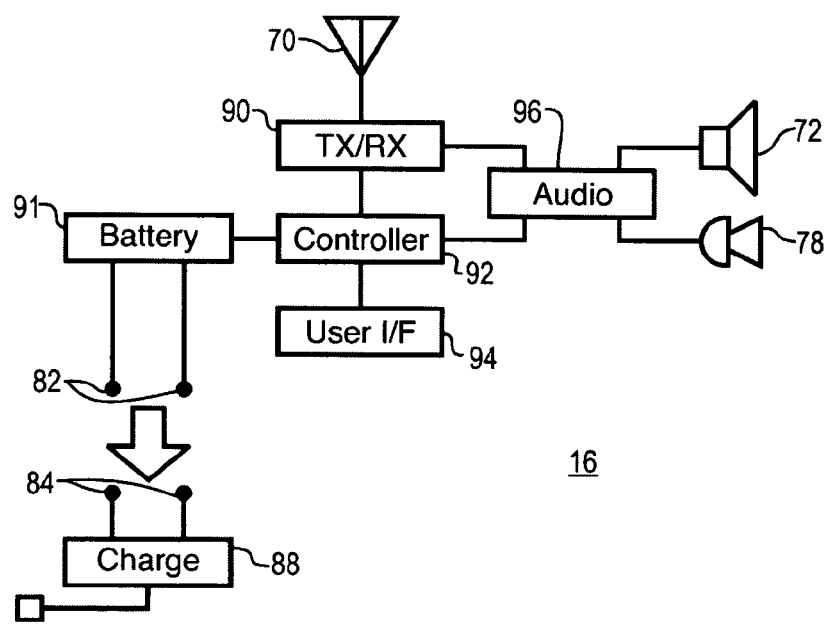
FIG. 7 is a functional block diagram of a cordless telephone handset and charging cradle according to an illustrative embodiment of the present invention.

Reference is directed to FIG. 7, which is a functional block diagram of a cordless telephone handset 16 and charging cradle according to an illustrative embodiment of the present invention. The cordless telephone handset is comprised of two components, the cordless telephone handset itself 16, and a charger 88, which is located in the aforementioned cradle 82. The cordless telephone handset 16 includes a cordless antenna 70 that couples cordless signals to and from a wireless node (not shown). The antenna 70 is coupled to a cordless transceiver 90 that modulates and demodulates cordless audio and cordless control signals. The cordless control signals are coupled to controller 92. The cordless audio signals are coupled to an audio circuit 96, which is adapted to couple an earphone 72 and a microphone 78. The earphone 72 and microphone 78 are located in the handset housing 16. A storage battery 91 provides power to all the circuitry in the telephone. An external power connector 82 is coupled to charge battery 91. A user interface 94 is provided for dialing, activating the hook-switch function, and for other dedicated functions as are known to those skilled in the art. An AC power adapter 88 is provided, which is coupled to external power connector to the charger 88 to charge battery 91 when the handset 16 is in the cradle 82.

Figure 8:
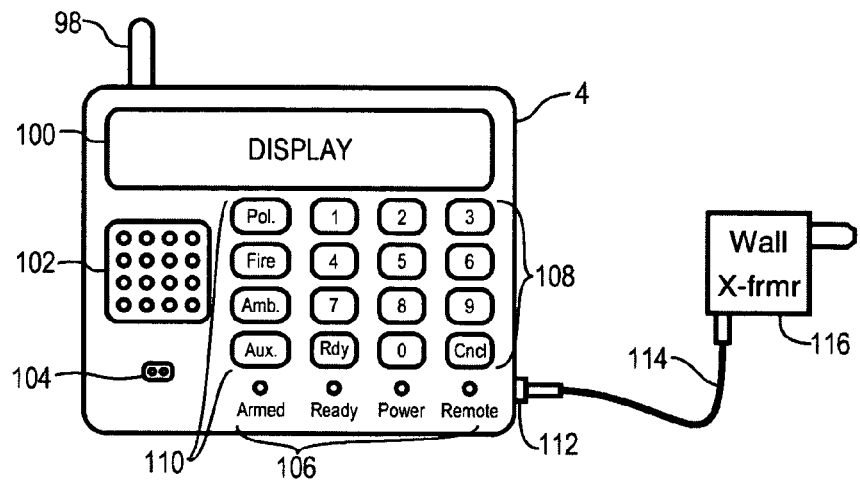
FIG. 8 is a drawing of a cordless control panel according to an illustrative embodiment of the present invention.

Reference is directed to FIG. 8, which is a drawing of a cordless control panel 4 according to an illustrative embodiment of the present invention. The cordless control panel 4 is the central access and control point for the cordless security system in the illustrative embodiment. The wireless node (not shown) hosts the security system, by establishing a cordless local area network, and the cordless control panel 4 embodies the security system functionality. Within the cordless control panel 4 is a processor or micro-controller with memory and preprogrammed software that embody the functionality of the security system. The user interface of the cordless control panel 4 includes a display 100, which may be of the liquid crystal variety, for presenting various systems status, configuration, alarm, operational modes, and other data, as are known to those skilled in the art. A microphone 104 and loudspeaker 102 are provided form input of an outgoing message, replaying of the outgoing message, and reproduction of other status sounds and tones, as are known to those skilled in the art. Several light-emitting diodes ("LED's") 106 are also presented in the user interface. These include a "Armed" indicator, a "Ready" indicator, a "Power" indicator, and an "Remote" indicator. The use and application of such indicators are known to those skilled in the art.

The cordless control panel 4 user interface also includes a number of key actuators. These include a telephone keypad style portion 108, which is used for entry of numeric data and other functions, and, a group of function keys 110. The numeric function keys 110 include emergency service hot buttons for Police, Fire, and Ambulance, and a Auxiliary key, which may be user programmable. The design and implementation of security system keypads are well known to those skilled in the art. The cordless control panel 4 is battery powered, with external power provided through a power connector 112, from a power cord 114 and wall-plug transformer 116, as are known to those skilled in the art. In a typical installation, the cordless control panel 4 is wall-mounted at a convenient location in the secured area, such as a home or office.

Figure 9:
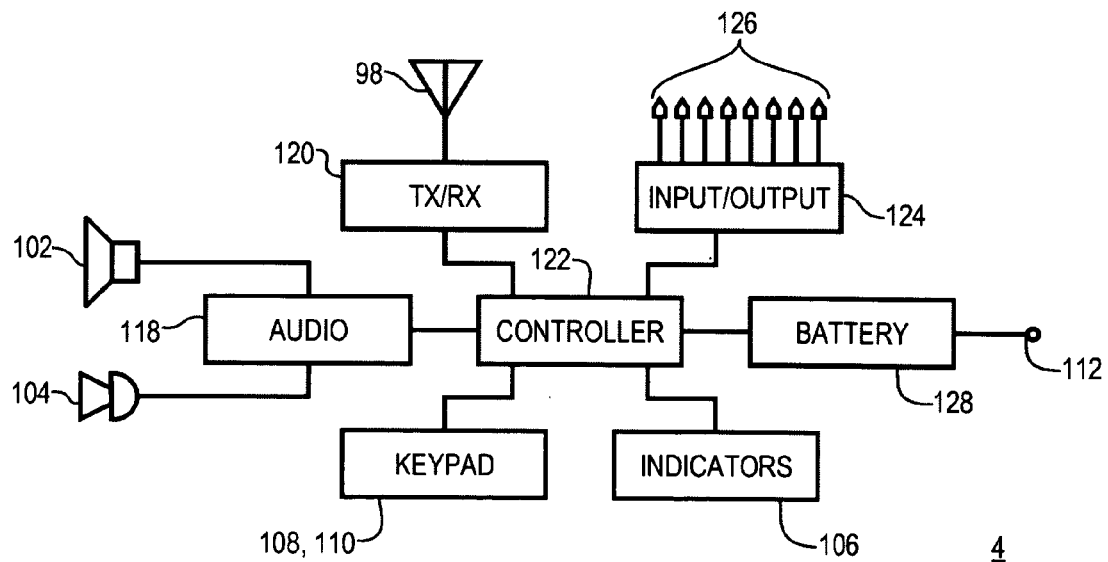
FIG. 9 is a functional block diagram of a cordless control panel according to an illustrative embodiment of the present invention.

Reference is directed to FIG. 9, which is a functional block diagram of the cordless control panel 4 according to an illustrative embodiment of the present invention. Cordless signals, including cordless audio and cordless data signals are coupled to and from the control panel 4 from the cordless local area network via cordless antenna 98. The antenna 98 is coupled to a cordless transceiver 120, which modulates and demodulates the aforementioned cordless signals. The transceiver 120 is controlled by controller 122, which is a microprocessor with memory and firmware in the illustrative embodiment. Those skilled in the art will appreciate that any control device suitable for dedicated control applications could be employed as controller 122. The microphone 104 and loudspeaker 102 are coupled to an audio circuit 118, which includes suitable amplifiers for these devices. Analog to digital and digital to analog converters are employed in the illustrative embodiment, so that audio signals can be digitized and stored in a computer memory. Such circuit designs are known to those skilled in the art. The audio circuits 118 are controlled by controller 122, which enables recording, playback and signal generation functions in the system. The keypad actuators 108, 110 and the indicator LED's are coupled to controller 122. A rechargeable battery 128 inside the control panel housing 4 provides power to the control panel 4 circuitry. An external connector 112 couples power in from the aforementioned wall transformer 116 (not shown).

Figure 10:
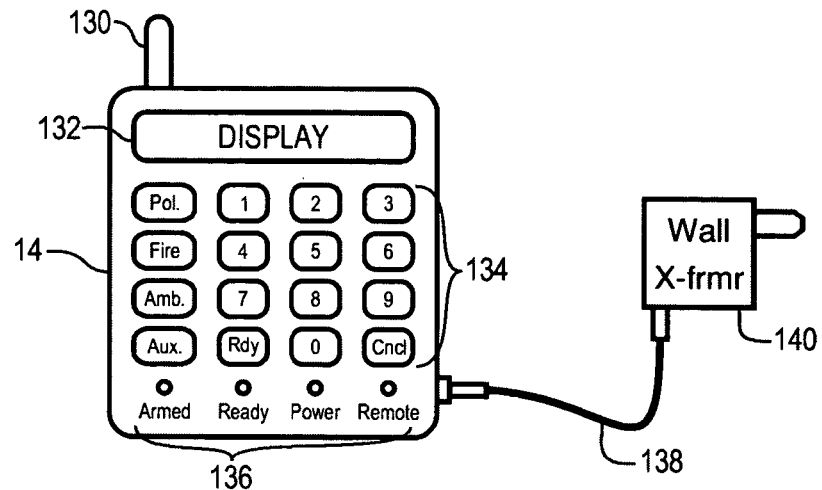
FIG. 10 is a drawing of a cordless remote keypad according to an illustrative embodiment of the present invention.

Reference is directed to FIG. 10, which is a drawing of a cordless remote keypad 14 according to an illustrative embodiment of the present invention. The cordless remote keypad 14 is used as a remote access and control point in the cordless security system. Typical uses include remote arming and disarming of the system, remote status indication, and security password entry. The remote keypads are typically located near entry points to the security system. An antenna 130 is provided for access to the security system via the aforementioned cordless local area network. The user interface of the cordless remote keypad 14 includes a display 132, which may be of the liquid crystal variety, for presenting various systems status, configuration, alarm, operational modes, and other data, as are known to those skilled in the art. Several light-emitting diodes ("LED's") 136 are also presented in the user interface. These include an "Armed" indicator, a "Ready" indicator, a "Power" indicator, and a "Remote" indicator. The use and application of such indicators are known to those skilled in the art. The cordless remote keypad 14 user interface also includes a number of key actuators. These include a telephone keypad style portion 134, which is used for entry of numeric data and other functions, and, a group of function keys. The function keys 134 include emergency service hot buttons for Police, Fire, and Ambulance, and a Auxiliary key, which may be user programmable. The design and implementation of security system keypads are well known to those skilled in the art. The cordless remote keypad 14 is battery powered, with external power provided through a power cord 138 and wall-plug transformer 140, as are known to those skilled in the art.

Figure 11:
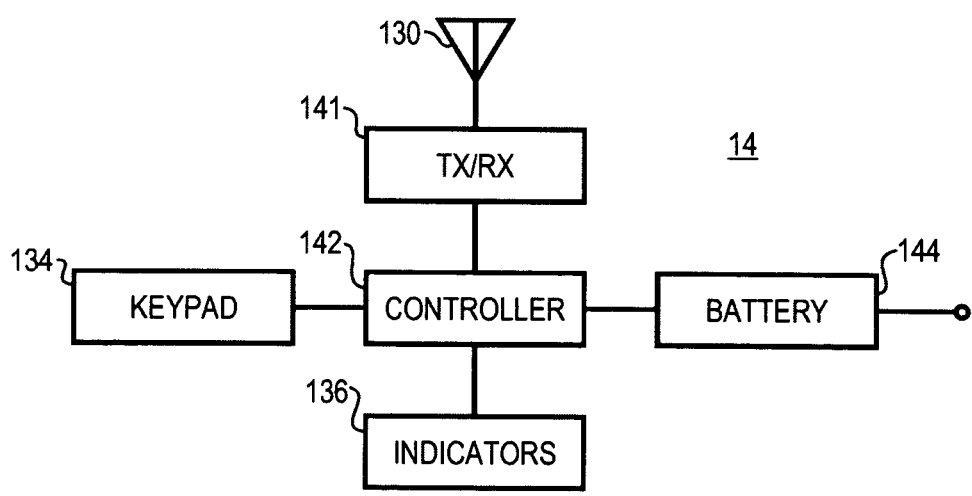
FIG. 11 is a functional black diagram of a cordless remote keypad according to an illustrative embodiment of the present invention.

Reference is directed to FIG. 11, which is a functional black diagram of the cordless remote keypad 14 according to an illustrative embodiment of the present invention. Cordless signals, including cordless data signals, are coupled to and from the cordless remote keypad 14 from the cordless local area network via cordless antenna 130. The antenna 130 is coupled to a cordless transceiver 141, which modulates and demodulates the aforementioned cordless signals. The transceiver 141 is controlled by controller 142, which is a microprocessor with memory and firmware in the illustrative embodiment. Those skilled in the art will appreciate that any control device suitable for dedicated control applications could be employed as controller 142. The keypad actuators 134 and the indicator LED's 136 are coupled to controller 142. A rechargeable battery 144 inside the remote keypad housing 14 provides power to the remote keypad 14 circuitry. An external connector couples power in from the aforementioned wall transformer 140 (not shown).

Figure 12:
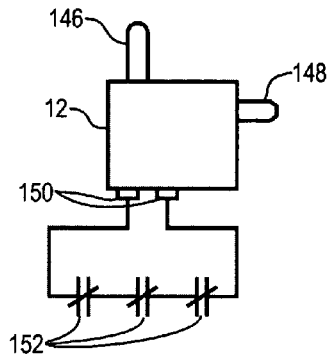
FIG. 12 is a drawing of a cordless conductive loop sensor according to an illustrative embodiment of the present invention.

Reference is directed to FIG. 12, is a drawing of a cordless conductive loop sensor 112 according to an illustrative embodiment of the present invention. The cordless conductive loop sensor 12 is used to couple a conductor across a series circuit that, when interrupted or broken, provides a sensor signal to the device. Typical applications include a series or door or window opening switches or conductive strip glass breakage circuits. In the illustrative embodiment, the device 12 is battery powered and is plugged into a convention AC wall outlet. This is accomplished with built-in AC plug 148. This approach provides a convenient mounting system and power source form the cordless conductive loop sensor 12. An antenna 146 is provided for access to the security system via the aforementioned cordless local area network. A pair of electrical terminals 150 are presented on the exterior of the housing 12 for connecting the series connected contact switches 152. The contact switches 152 are normally closed, such that an opening of any of the switches results in the sensing of an alarm condition.

Figure 13:
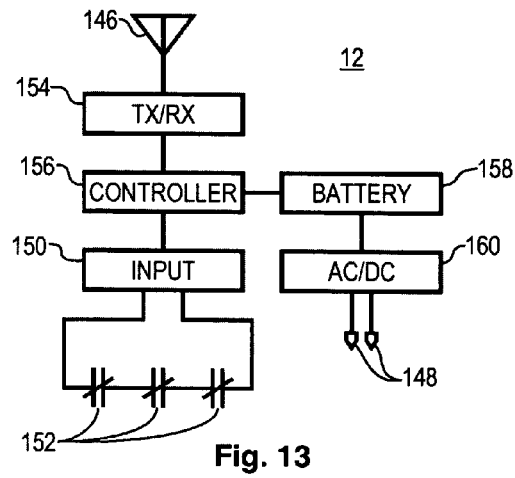
FIG. 13 is a functional block diagram of a cordless conductive loop sensor according to an illustrative embodiment of the present invention.

References is directed to FIG. 13, which is a functional block diagram of the cordless conductive loop sensor 12 according to an illustrative embodiment of the present invention. Cordless signals, including cordless data signals, are coupled to and from the cordless conductive loop sensor 12 from the cordless local area network via cordless antenna 146. The antenna 146 is coupled to a cordless transceiver 154, which modulates and demodulates the aforementioned cordless signals. The transceiver 154 is controlled by controller 156, which is a microprocessor with memory and firmware in the illustrative embodiment. Those skilled in the art will appreciate that any control device suitable for dedicated control applications could be employed as controller 156. An input circuit 150 couples the contacts for the conductive loop switches a50 to the controller 156. The device 12 is powered by an internal rechargeable battery 158, which is continuously trickle-charged by an internal AC to DC power supply 160, that is coupled to AC plug 148.

Figure 14:
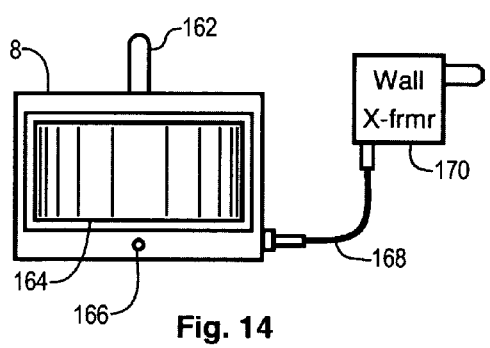
FIG. 14 is a drawing of a cordless motion sensor according to an illustrative embodiment of the present invention.

Reference is directed to FIG. 14, which is a drawing of a cordless motion sensor 8 according to an illustrative embodiment of the present invention. The cordless motion sensor 8 is used to detect motion within its sensor field, such as an unauthorized person moving within a secured area. In the illustrative embodiment, a passive infrared detector 164 is used to detect the presence of an intruder. Those skilled in the art will appreciate that other motion sensor technologies are equally applicable to the teachings of the present invention. An LED 166 is provided on the front of the device 8, and is illuminated when motion is detected. When motion is detected, the device transmits a sensor signal into the cordless local area network through antenna 162. In the illustrative embodiment, the device 8 is battery powered and is coupled via cable 168 to wall-plug transformer 170.

Figure 15:
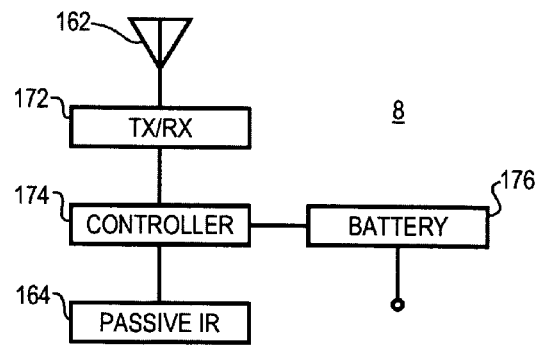
FIG. 15 is a functional block diagram of a cordless motion sensor according to an illustrative embodiment of the present invention.

Reference is directed to FIG. 15, which is a functional block diagram of the cordless motion sensor 8 according to an illustrative embodiment of the present invention. Cordless signals, including cordless data signals, are coupled to and from the cordless conductive motion sensor 12 from the cordless local area network via cordless antenna 162. The antenna 162 is coupled to a cordless transceiver 172, which modulates and demodulates the aforementioned cordless signals. The transceiver 172 is controlled by controller 174, which is a microprocessor with memory and firmware in the illustrative embodiment. Those skilled in the art will appreciate that any control device suitable for dedicated control applications could be employed as controller 174. A passive infrared detector circuit 164 provides an output indicative of the presence of a person or objection within the sensor's 164 field of view. The device 8 is powered by an internal rechargeable battery 176, which is recharged from the external power supply 170.

Figure 16:
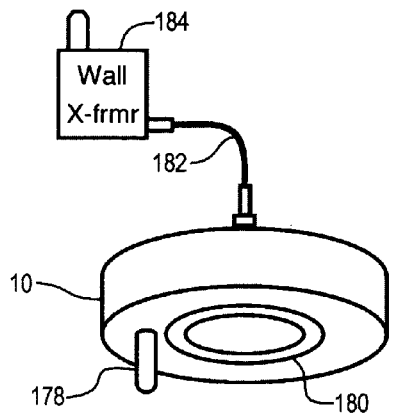
FIG. 16 is a drawing of a cordless smoke detector according to an illustrative embodiment of the present invention.

Reference is directed to FIG. 16, which is a drawing of a cordless smoke detector 10 according to an illustrative embodiment of the present invention. The cordless smoke sensor 8 is used to detect smoke within the space surrounding the detector 10. In a similar embodiment, a cordless carbon monoxide detector is realized by employing a carbon monoxide detector instead of a smoke detector. In the illustrative embodiment, an ionizing smoke detector 180 is used to detect the presence of smoke. Those skilled in the art will appreciate that other smoke sensor technologies are equally applicable to the teachings of the present invention. When smoke is detected, the device transmits a sensor signal into the cordless local area network through antenna 178. In the illustrative embodiment, the device 10 is battery powered and is coupled via cable 182 to wall-plug transformer 184. In typical applications, the smoke detector 10 is ceiling mounted for optimum smoke detections.

Figure 17:
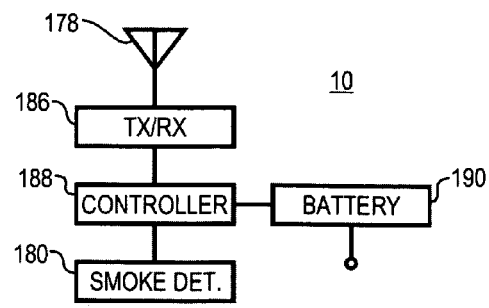
FIG. 17 is a functional block diagram of a cordless smoke detector according to an illustrative embodiment of the present invention.

Reference is directed to FIG. 17, which is a functional block diagram of the cordless smoke detector 10 according to an illustrative embodiment of the present invention. Cordless signals, including cordless data signals, are coupled to and from the cordless smoke detector 10 from the cordless local area network via cordless antenna 178. The antenna 178 is coupled to a cordless transceiver 186, which modulates and demodulates the aforementioned cordless signals. The transceiver 186 is controlled by controller 188, which is a microprocessor with memory and firmware in the illustrative embodiment. Those skilled in the art will appreciate that any control device suitable for dedicated control applications could be employed as controller 188. An ionizing smoke detector 180 provides an output indicative of the presence of smoke within the monitored area of the detector 10. The device 10 is powered by an internal rechargeable battery 190, which is recharged from the external power supply 184.

Figure 18:
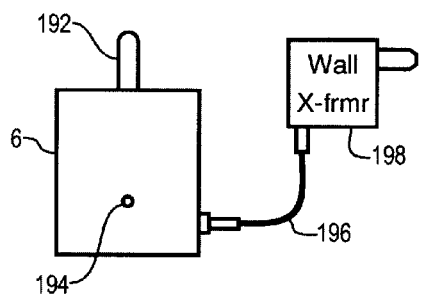
FIG. 18 is a drawing of a cordless glass breakage sensor according to an illustrative embodiment of the present invention.

Reference is directed to FIG. 18, which is a drawing of a cordless glass breakage sensor 6 according to an illustrative embodiment of the present invention. The cordless glass breakage sensor 6 is used to detect the sound of glass breaking, which has readily discernable frequency content, and is therefore reliably detectable. In the illustrative embodiment, a microphone 194 is used to pick up sound in the vicinity of the detector 6. When the sound of glass breaking is detected, the device 6 transmits a sensor signal into the cordless local area network through antenna 192. In the illustrative embodiment, the device 6 is battery powered and is coupled via cable 196 to wall-plug transformer 198.

Figure 19:
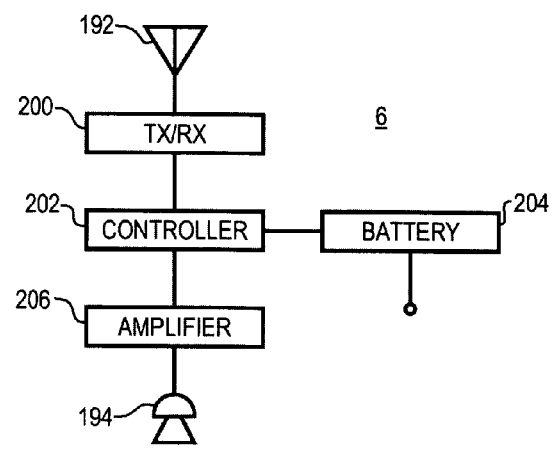
FIG. 19 is a functional block diagram of a cordless glass breakage sensor according to an illustrative embodiment of the present invention.

Reference is directed to FIG. 19, which is a functional block diagram of the cordless glass breakage sensor 6 according to an illustrative embodiment of the present invention. Cordless signals, including cordless data signals, are coupled to and from the cordless glass breakage detector 6 from the cordless local area network via cordless antenna 192. The antenna 192 is coupled to a cordless transceiver 200, which modulates and demodulates the aforementioned cordless signals. The transceiver 200 is controlled by controller 202, which is a microprocessor with memory and firmware in the illustrative embodiment. Those skilled in the art will appreciate that any control device suitable for dedicated control applications could be employed as controller 202. A frequency selective amplifier 206 is coupled to receive microphone signals from microphone 194. Those skilled in the art are familiar with the characteristic frequency content of breaking glass, and the frequency selective nature of such amplifiers. The device 6 is powered by an internal rechargeable battery 204, which is recharged from the external power supply 198.

Reference is directed to FIG. 20, which is a drawing of a cordless siren 20 according to an illustrative embodiment of the present invention. The cordless siren 20 includes a horn type loudspeaker 212 capable of producing high sound pressure levels. A circuit housing portion 210 houses the electronics of the siren 20, where the antenna 208 is visible. The siren 20 is powered from an internal rechargeable battery (not shown) that is recharged via cable 222 from a wall-plug transformer 224.

Reference is directed to FIG. 21, which is a functional block diagram of a cordless siren 20 according to an illustrative embodiment of the present invention. Cordless signals, including cordless data signals, are coupled to and from the cordless siren 20 from the cordless local area network via cordless antenna 208. The antenna 208 is coupled to a cordless transceiver 214, which modulates and demodulates the aforementioned cordless signals. The transceiver 214 is controlled by controller 216, which is a microprocessor with memory and firmware in the illustrative embodiment. Those skilled in the art will appreciate that any control device suitable for dedicated control applications could be employed as controller 216. In operation, an alarm signal is received by transceiver 214, which is indicative of an alarm condition. The controller 216 receives this signal and generates an audio siren tone. The audio siren tone is amplified by audio power amplifier 218 and is coupled to loudspeaker 212, which reproduces the siren tone at high sound pressure levels. The device 20 is powered by an internal rechargeable battery 220, which is recharged from the external power supply 224.

Reference is directed to FIG. 22a and FIG. 22b are an end view and side view, respectively, of a cordless alarm output receiver 18 according to an illustrative embodiment of the present invention. The cordless alarm output receiver 18 is used to drive an external device, either by switching AC line power to the device or by activating a switch to enable or disable and external device. In the illustrative embodiment, the AC line power approach is shown. The device 18 has an AC plug 228 that plugs into a conventional AC wall outlet (not shown). An antenna 226 receives an alarm condition signal from the cordless local area network. A relay (not shown) within the device 18 is closed upon receipt of the alarm condition signal, which couples AC power through to the AC outlet 230 on the exterior of the device. In typical applications, the device 18 is used to cycle lighting or other appliances either in response to an alarm condition of over certain periods of time, mimicking routine human activity.

Reference is directed to FIG. 23, which is a functional block diagram of the cordless alarm output receiver 18 according to an illustrative embodiment of the present invention. Cordless signals, including cordless data signals, are coupled to and from the cordless alarm output receiver 18 from the cordless local area network via cordless antenna 226. The antenna 226 is coupled to a cordless transceiver 232, which modulates and demodulates the aforementioned cordless signals. The transceiver 232 is controlled by controller 234, which is a microprocessor with memory and firmware in the illustrative embodiment. Those skilled in the art will appreciate that any control device suitable for dedicated control applications could be employed as controller 234. In operation, an alarm signal is received by transceiver 232, which is indicative of an alarm condition. The controller 234 receives this signal and activates a relay 238 that is coupled between the AC plug 228 and the AC receptacle 230. Closure of the relay 238 "turns on" whatever device is plugged into receptacle 230. The device 20 is powered by an internal rechargeable battery 236, which is recharged from an internal AC to DC power supply 240.

Figure 24:
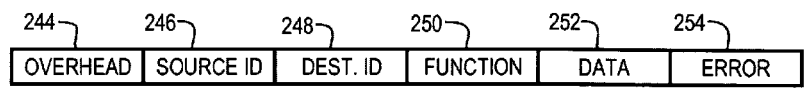
FIG. 24 is a data diagram of a cordless data packet according an illustrative embodiment of the present invention.

Reference is directed to FIG. 24, which is a data diagram of a cordless data packet according an illustrative embodiment of the present invention. The cordless data signals transmitted within the cordless local area network carry cordless telephone protocol control information, security systems control information, and other data needed to support the local area network protocol. A packet data approach is employed. Each data packet 242 consists of several data fields. Protocol overhead bits, including synchronization, framing, and timing are placed in an overhead field 244. Each packet 242 contains a source identifier field 246 and a destination identifier field 248. The size of these fields is determined according to the number of unique devices that are supported by the protocol. In the illustrative embodiment, eight bits are used to define up to two-hundred fifty-six unique devices. By employing unique identifiers, any device in the cordless local area network is able to address any other device. An addition, each device receiving a data packet is able to determine which device sent the packet. This approach allows for prioritization of messages and commands. A function field 250 is used to specify functional operations within the system, such as alarm responses, operational status of terminal devices, network operation and configuration and so forth. A data field 252 is provided, and is used to communication data from device to device. Examples of data are security codes and passwords, programming information, digitally encoded audio signals and so forth. Finally, a error field 254 is provided to detect and correct errors in transmission. Simple check sums can be transmitted, with a corresponding retransmission request to correct the error, or forward error correction can be employed. Those skilled in the art will appreciate that various data transmission protocols can be support in the cordless local area network, whether they are existing, promulgated, standards, or a proprietary standard as used in the illustrative embodiment.

Figure 25:
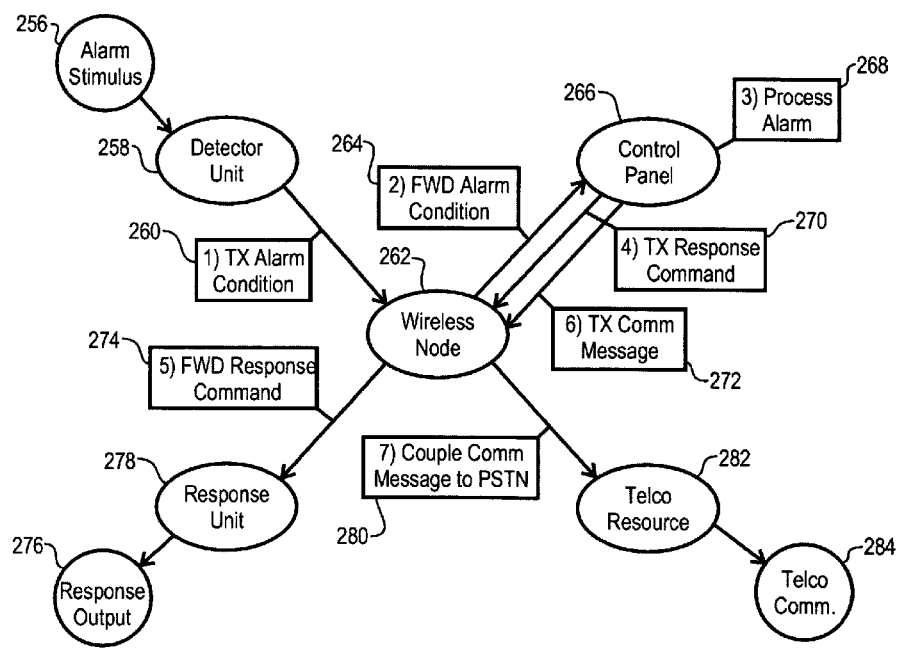
FIG. 25 is a signal flow diagram according an illustrative embodiment of the present invention.

Reference is directed to FIG. 25, which is a signal flow diagram according an illustrative embodiment of the present invention. The signal flow diagram illustrates one of various methods of operation of the cordless security system. In FIG. 25, the wireless node 262 is routing data packet and signal flow between a detector unit 258, the control panel 266, and a response unit 278. In addition, a telephone resource, such as a metallic PSTN circuit or a wireless circuit is used to communicate an alarm condition to an outside recipient. The process method illustrated in FIG. 25 is that of an alarm stimulus propagating through the cordless security system. The initial action is that of an alarm stimulus 256, such as the detection of motion, smoke, or the breaking of a conductive loop circuit, for example. The detector unit 258 generates and transmits an alarm condition data packet 260 with a destination ID set to the control panel, and which is coupled into the cordless local area network by the detector unit 258. The wireless node 262 receives the data packet and forwards it to the control panel 266. In another embodiment, the data packet propagates directly from the detector unit 258 to the control panel 266. This is a design choice, based on whether the system operates as a simplex radio system, a half-duplex radio system, or a full duplex radio system.

Once the alarm condition data packet is received at the control panel 266, the control panel selects an appropriate response, based on system configuration and programming. Such configurations are known to those skilled in the art. Inn the illustrative embodiment, the control panel responds by activating a response unit, such as an alarm siren. This action is initiated by the control panel 266 sending an alarm signal response command 270 over the cordless local area network. The wireless node 262 receives the command and forwards it 270 to the response unit 278, which is a siren in this illustration. The siren is activated and the siren response output 276 is the production of a high sound pressure level siren sound. In addition to the response command 270, the control panel 266 recalls and transmits an outgoing message, together with a telephone number for coupling to an outside entity, which is a security monitoring service in the illustration. This action is initiated with transmitted communications message 272. The message 272 is received by the wireless node, which responds be accessing the wireless telephone resource 282 and completing the required telephonic communications 284 to the specified telephone number, thereby replaying the outgoing message to the recipient of the telephone call.

Figure 26:
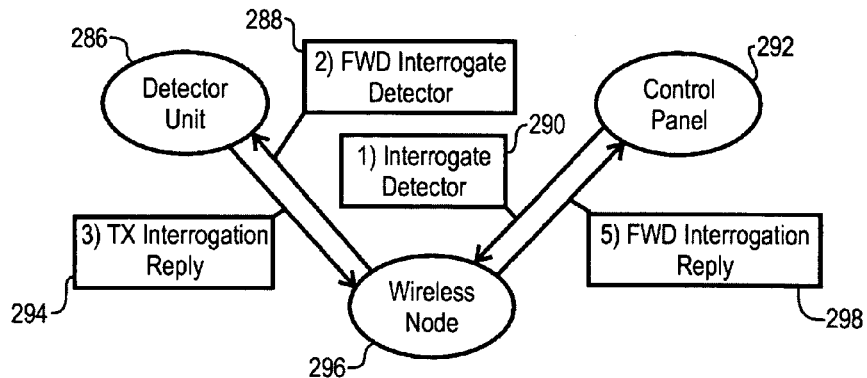
FIG. 26 is a signal flow diagram according an illustrative embodiment of the present invention.

Reference is directed to FIG. 26, which is a signal flow diagram according an illustrative embodiment of the present invention. In FIG. 26, the control panel 292 is checking the function of one of the detector units, in a routine system maintenance function. The control panel 292 generates and transmits an interrogate detector signal 290 and transmits it into the cordless local area network. The wireless node forwards the interrogate detector signal 288 to the target detector unit 286. The detector unit 286 responds by transmitting an interrogation reply signal to the wireless node. Of course, one possibility is that the detector unit gives no reply, which is in and of itself a report on the status of the detector unit 286. The interrogation reply signal may also include one or more operation parameters of the detector unit, such as detector status, battery or AC power, number of alarms, and etc. The interrogation reply signal 3 is forward by the wireless node 296 back to the control panel 292 via a forwarded interrogation reply signal 298. In this way, the cordless security system is able to automatically or manually check the operation status of the various detectors and other terminal devices in the network.

Figure 27:
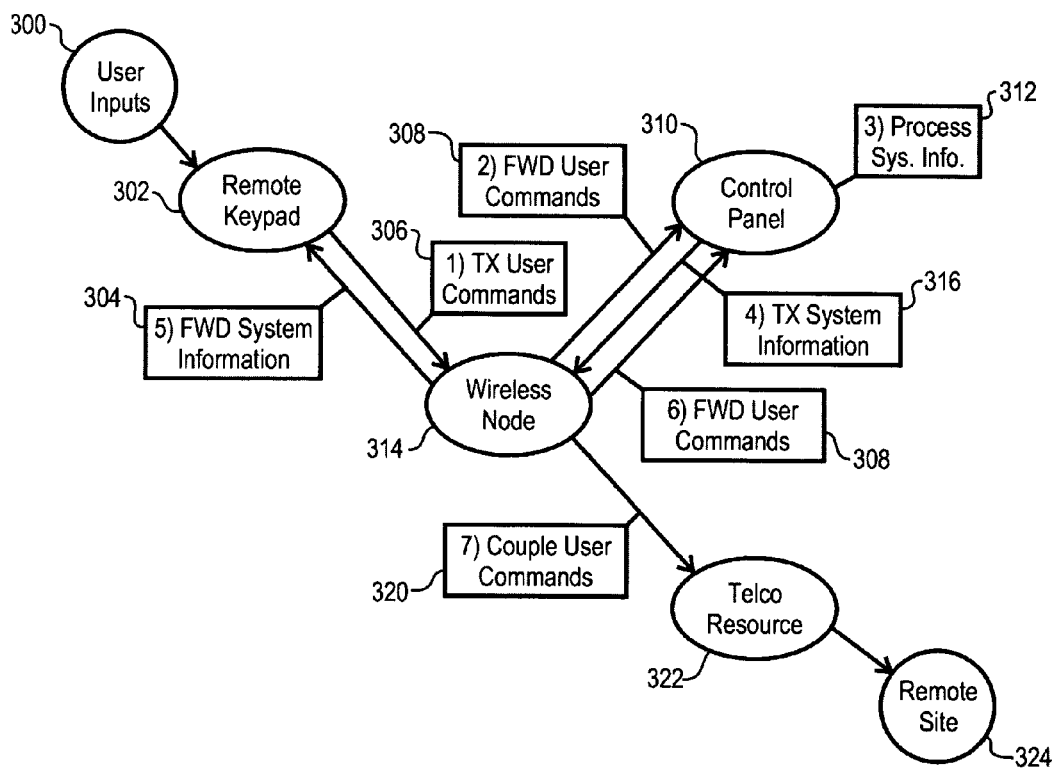
FIG. 27 is a signal flow diagram according an illustrative embodiment of the present invention.

Reference is directed to FIG. 27, which is a signal flow diagram according an illustrative embodiment of the present invention. In FIG. 27, user access of a remote keypad is considered. The process is initialized when a user inputs a command 300 at a remote keypad terminal device. For example, the user might activate a call-police panic command. The remote keypad 302 transmits the user command 306 into the cordless local area network. The wireless node 314 receives and forwards the command 308 to the control panel 310. The control panel processes the command 312 and generates a system information message 316. The system information message is intended to confirm receipt and processing the user input. The system information message 316 is received by the wireless node 314 and is forwarded 304 to the remote keypad 302, which informs the user of the signaling success. In addition, the control panel forwards the user command 308 to the wireless node 314. The wireless node allocates the telephone resource, such as the wireless telephone resources and places a call to the remote site, which is the police in this illustration. Note that the control panel may include an outgoing message in the forward user command 6 signal.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A cordless security system operable to communicate with a wireless telephone network, comprising:
    a wireless node, having;
        a wireless transceiver adapted to communicate wireless signals with the wireless telephone network;
        a cordless transceiver adapted to communicate cordless signals with plural cordless terminal devices, thereby enabling a cordless local area network;
        a controller operable to couple telephone calls between said wireless transceiver and said cordless transceiver, thereby enabling access to the wireless telephone network through said cordless local area network, said controller operable to route cordless data packet portions of said cordless signals through said cordless transceiver and amongst said plural cordless terminal devices;
    a cordless security sensor terminal device operable to communicate a cordless sensor signal encoded within a cordless data packet into said cordless local area network upon receipt of an external stimulus;
    a cordless security control panel terminal device operable to communicate a cordless alarm signal encoded within a cordless data packet into said cordless local area network upon receipt of said cordless sensor signal, and operable to transmit a cordless outgoing audio message within said cordless local area network, and wherein
    said wireless node is operable to receive and route said cordless outgoing audio message through the wireless telephone network to a predetermined telephone number.

2. The system of claim 1, further comprising:
    a cordless telephone terminal device operable to communicate cordless signals, including cordless audio signals, within said cordless local area network, thereby enabling telephone communications through said wireless node and into the wireless telephone network.

3. The system of claim 2 wherein said wireless node is operable to route said cordless outgoing message to said cordless telephone terminal device.

4. The system of claim 1, further comprising:
    a cordless security alarm terminal device having an alarm output, and operable to activate said alarm output upon receipt of said cordless alarm signal.

5. The system of claim 4, wherein said cordless security alarm terminal device is a cordless siren or a cordless alarm output receiver.

6. The system of claim 1 wherein said cordless data packet portions are uniquely addressed.

7. The system of claim 1 wherein said cordless data packet portions are uniquely addressed with a source and destination cordless terminal device identifier.

8. The system of claim 1, wherein said cordless security control panel further comprises:
    a microphone;
    a loudspeaker, and
    an audio recording means coupled to said microphone and said loudspeaker, and operable to store outgoing message audio signals input to said microphone, and to output said outgoing message audio signals to said loudspeaker.

9. The system of claim 8, wherein said cordless security control panel further comprises:
    an alphanumeric display;

a keypad, and a processor coupled to said alphanumeric display and said keypad, and operable to process security system commands entered via said keypad, and to output security system information to said alphanumeric display.

10. The system of claim 1, wherein said plural cordless terminal devices include one or more of a cordless conductive loop sensor, a cordless smoke detector, a cordless carbon monoxide sensor, a cordless motion detector, and a cordless glass breakage sensor.

11. The system of claim 1, further comprising a cordless remote keypad terminal device having:

a keypad, and a processor coupled to said keypad, and operable to process security system commands entered via said keypad, and to output said security systems commands encoded within cordless data packets to said cordless local area network.

12. The system of claim 1, wherein said wireless node further comprises:

a metallic telephone line interface coupled to said controller, and wherein said controller is operable to couple telephone calls between said metallic telephone line interface and said cordless transceiver, thereby enabling access to the public switched telephone network through said cordless local area network.

13. The system of claim 1, wherein said wireless node further comprises:

a subscriber identity module interface adapted to accept subscriber identity modules having user wireless account identities and data stored therein coupled to said controller, and wherein said controller is operable to transfer user account identity data from said subscriber identity module interface to the wireless telephone network.

14. A method of implementing a cordless security system coupled to a wireless telephone network through a wireless node, the wireless node having a cordless transceiver adapted to communicate cordless signals, according to a cordless local area network protocol, with plural cordless terminal devices, which includes a cordless security sensor terminal device and a cordless security control panel terminal device, the method comprising the steps of:

communicating a cordless sensor signal encoded within a cordless data packet from the cordless security sensor terminal device into the cordless local area network upon receipt of an external stimulus;

routing said cordless sensor signal by the wireless mode to the cordless security control panel terminal device;

communicating a cordless alarm signal encoded within a cordless data packet, by the cordless security control panel terminal device, into said cordless local area network upon receipt of said cordless sensor signal;

transmitting a cordless outgoing audio message, by the a cordless security control panel terminal device, into the cordless local area network;

routing the cordless outgoing audio message through the wireless telephone network to a predetermined telephone number as a wireless telephone call.

15. The method of claim 14, further comprising the steps of:

coupling a telephone call from a cordless telephone terminal device into the wireless telephone network by;

communicating cordless signals, including cordless audio signals, within the cordless local area network, and enabling telephone communications through said wireless node and into the wireless telephone network.

16. The method of claim 14 further comprising the step of routing the cordless outgoing audio message to a cordless telephone terminal device.

17. The method of claim 14, further comprising the step of activating an alarm output of a cordless security alarm terminal device upon receipt of said cordless alarm signal.

18. The method of claim 17, wherein the cordless security alarm terminal device is a cordless siren or a cordless alarm output receiver.

19. The method of claim 14, further comprising the step of uniquely addressing the cordless data packet portions.

20. The method of claim 14 further comprising the step of uniquely addressing the cordless data packet portions a source and destination cordless terminal device identifier.

21. The method of claim 14, further comprising the steps of pre-recording and storing the cordless outgoing audio message.

22. The method of claim 14, wherein the plural cordless terminal devices include one or more of a cordless conductive loop sensor, a cordless smoke detector, a cordless carbon monoxide sensor, a cordless motion detector, and a cordless glass breakage sensor.

23. The method of claim 14, wherein the wireless node further includes a metallic telephone line interface, the method further comprising the step of:

coupling a telephone calls between the metallic telephone line interface and the cordless transceiver, thereby enabling access to the public switched telephone network through the cordless local area network.

24. The method of claim 14, wherein the wireless node further includes a subscriber identity module interface adapted to accept subscriber identity modules having user wireless account identities and data stored therein, the method further comprising the step of:

transferring user account identity data from the subscriber identity module interface to the wireless telephone network.

* * * * *